United States Patent [19]

Sawada et al.

[11] Patent Number: 4,673,790

[45] Date of Patent: Jun. 16, 1987

[54] COPPER BASED WIRE ELECTRODE FOR WIRE ELECTRO-DISCHARGE MACHINING

[75] Inventors: Kazuo Sawada, Osaka; Satoshi Takano, Suita; Shigeo Ezaki, Takatsuki, all of Japan

[73] Assignee: Sumitomo Electric Industries, Ltd., Osaka, Japan

[21] Appl. No.: 737,081

[22] Filed: May 23, 1985

[30] Foreign Application Priority Data

May 23, 1984 [JP] Japan ................................ 59-105508
Jun. 21, 1984 [JP] Japan ................................ 59-128978

[51] Int. Cl.$^4$ .............................................. B22H 7/08
[52] U.S. Cl. ................................................ 219/69 W
[58] Field of Search ........................ 219/69 W, 69 E; 148/11.5 C, 13, 2, 413, 434; 420/477

[56] References Cited

U.S. PATENT DOCUMENTS

| | | | |
|---|---|---|---|
| 1,933,390 | 10/1933 | Ray | 420/477 |
| 3,929,516 | 12/1975 | Cheskis et al. | 148/11.5 R |
| 4,099,991 | 7/1978 | Pops et al. | 148/11.5 C |

FOREIGN PATENT DOCUMENTS

| | | | |
|---|---|---|---|
| 53-49397 | 5/1978 | Japan | 219/69 W |
| 125221 | 11/1978 | Japan | 420/477 |
| 57-41134 | 3/1982 | Japan | 219/69 W |
| 58-94926 | 6/1983 | Japan | 219/69 W |
| 202727 | 11/1983 | Japan | 219/69 W |
| 59-19639 | 2/1984 | Japan | 219/69 W |
| 205441 | 11/1984 | Japan . | |
| 222547 | 12/1984 | Japan . | |

*Primary Examiner*—A. D. Pellinen
*Assistant Examiner*—Geoffrey S. Evans
*Attorney, Agent, or Firm*—Cushman, Darby & Cushman

[57] ABSTRACT

A wire electrode for use in electro-discharge machining is formed essentially of Cu, including Zn of 5 through 38% by weight and Si of 0.1 through 0.5% by weight so as to suppress sputtering of the electrode material to the workpiece and to improve workability. The wire electrode may include Zn of 30 through 40% by weight, Si of 0.1 through 1.2% by weight and Al of 0.01 through 0.2% by weight in addition to Cu.

3 Claims, No Drawings

COPPER BASED WIRE ELECTRODE FOR WIRE ELECTRO-DISCHARGE MACHINING

FIELD OF THE INVENTION

The present invention relates to an electrode for use in wire electro-discharge machining.

BACKGROUND OF THE INVENTION

Wire electric-discharge machining involves processing a workpiece such as metallic material, wherein an electrode wire is opposed to the workpiece with a suitable gap formed therebetween, causing electric discharge between the wire electrode and the workpiece through a medium such as water or the like displacing the wire electrode and the work relatively so as to cut or shape the work according to a predetermined pattern.

In electro-discharge machining as mentioned above, conventionally an elongated electrode wire with a 0.05 to 0.25 mm diameter is prepared and the electrode wire is fed to the work as the end portion of the wire is exhausted.

The following conditions are generally required of the wire electrode used in discharge machining, (1) processing speed; a faster processing speed is required compared to the processing speed obtained by the conventional wire electrode;

(2) accuracy of the dimension and condition of the surface of the shaped workpiece; the shaping process must be done with high accuracy without causing pieces of the wire electrode to be sputtered onto the surface of the workpiece;

(3) workability; interruption of the wire electrode during the electric discharge machining must be decreased;

(4) cost; it is desired that the cost of the wire electrode must be as low as possible since the wire electrode is exhausted.

The processing speed may be made high by stabilizing the electric discharge between the wire electrode and the workpiece. However, the conventional wire electrode tends to cause the surface of the workpiece to be rough when the processing speed is fast.

In order to shape the work piece with high accuracy, it is necessary to use the wire electrode of a high accuracy diameter stretching the wire electrode with high tension. Therefore, the wire electrode must be strong enough to prevent break down of the wire by the tension.

In order to shape the surface of the workpiece and prevent formation of a rough surface, the electric discharge between the wire electrode and the workpiece must be stable and uniform. With the conventional wire electrode, it has been difficult to satisfy both requirements of increasing the processing speed and improving the accuracy of the workpiece with a good surface condition, therefore it is strongly desired to provide wire electrodes which satisfy the requirements as mentioned above.

In addition, the wire electrode may be broken down due to electrical shortage between the wire electrode and the workpiece, nonuniform discharge, or the tension loaded on the wire electrode; there are required a high accuracy of the wire, behavior of electric discharging and a high tensile strength.

Other requirements for the wire electrode are inexpensiveness of the alloy material and the workability of drawing wire into a thin wire such as 0.05 to 0.25 mm diameters.

Conventionally, as the wire electrodes, copper wires, brass wires (Cu containing 30% or 35% Zn) and tungsten wires have been used. However, the conventional wire electrodes made of the materials mentioned above do not fulfil the above mentioned requirements as explained hereinafter.

The copper wires tend to be broken down due to relatively low mechanical strength, and the processing speed is lower than that obtained with the use of the brass wires.

Although the brass wires can improve the processing speed compared to that of the copper wires, the processing speed obtained by the brass wires is still not sufficient. Futhermore, the brass wire electrodes can not provide a high size accuracy and a sufficient surface condition of the workpiece. The brass wire electrodes show another disadvantage in that the workability is not good.

The disadvantages of the tungsten wire electrodes are difficulty in wire drawing work and cost.

In order to eliminate the disadvantages as mentioned above, Japanese Patent Publication (Unexamined) Tokkai No. sho 59-50141 discloses the wire electrode material composed of essentially Cu including Zn of 20 through 50% by weight and one or more components of Ni, Co and Si with the total amount of 0.5 through 2% by weight. Futhermore, Japanese Patent Publication (Unexamined) Tokkai No. sho 57-41134 discloses the wire electrode material composed of essentially Cu including Zn of 5 through 40% by weight and Al of 0.1 through 4% by weight.

However, the former materials have the drawback that the workability of casting and wire drawing is inferior if Si is included more than 1.5% by weight. As to the latter material, sputtering of the wire electrode to the workpiece can not be suppressed in case of a high accuracy machining with pure water of high resistivity.

DESCRIPTION OF THE INVENTION

An essential object of the present invention is to provide a wire electrode for use in electro-discharge machining which permits improving the processing speed and shaping of the workpiece with a uniform surface and a high accuracy at a low cost.

According to the wire electrode of the present invention, the wire electrode is made of alloy essentially comprising copper containing Zn of 5 through 38% by weight and Si of 0.1% through 0.5% by weight.

ZN is added to the wire electrode material either to increase the processing speed of the electro discharge machining and to reinforce the mechanical strength of the wire electrode.

The amount of Zn in the wire electrode material according to the present invention is 5 through 38% by weight, partly because with Zn less than 5% by weight the technical effects described above can not be expected and partly because with Zn more than 38%, the characteristics of the wire electrode can not be so improved by an increment of the amount of Zn, which rather increases difficulty of the workability of wire drawing.

Si is added to the wire electrode material to reinforce the mechanical strength of the wire under a high temperature such as 300° to 400° C. so as to prevent the break down of the wire electrode, and to prevent undesired sputtering of the wire electrode onto the workpiece.

The amount of Si in the wire electrode material is 0.1% through 0.5% by weight partly because with Si less than 0.1% by weight, the technical effects described above can not be expected, and partly because with Si more than 0.5% by weight, workability of the wire electrode material is decreased without increase of the technical effects described above.

The wire electrode material according to the present invention may include one or more components such as Sn, Ag, Mg, Al and Fe as impurities with the total amount less than 1% by weight.

The wire electrode according to the present invention may be composed of essentially copper material including Zn of 30 through 40% by weight, Si of 0.1 through 1.2% by weight and Al of 0.01 through 0.2% by weight.

The wire electrode according to the present invention may be composed of essentially copper material including Zn of 30 through 40% by weight, Si of 0.1 through 1.2% by weight, Al of 0.01 through 0.2% by weight and one or two components selected from a group comprising Ga, In, Sn, Mg, Zr and Y with the total amount of 0.05 through 0.5% by weight.

The wire electrode material composed of essentially copper material including Zn, Si and Al with Si less than 1.2% by weight and Al less than 0.2% by weight shows a good wire drawing characteristic and a behavior of electric discharging characteristic in which sputtering of Cu component to the workpiece can be decreased to a negligible value. Addition of one or two kinds of components selected from the group comprising Ga, In, Sn, Mg, Zr and Y with the amount of 0.05 through 0.5% by weight enables a reenforcement of the mechanical strength of the wire electrode under the high temperature in addition to suppression of sputtering of the Cu component.

The amount of Zn of the wire electrode material is selected from 30 through 40% by weight partly because with Zn less than 30% by weight, the processing speed can not be improved and partly because with Zn more than 40% by weight, drawability is harmed.

The amount of Si is selected within 0.1% through 1.2% by weight partly because with Si less than 0.1% by weight, the processing speed can not be improved and partly because with Si more than 1.2% by weight, the workability of casting and wire drawability are poor.

The amount of Al is selected with 0.01% through 0.2% by weight partly because with Al less than 0.01%, the wire drawability can not be improved, and partly because with Al more than 0.2% by weight, the wire drawing characteristic is lowered.

The amount of the composition selected from the group of Ga, In, Sn, Mg, Zr and Y is selected within 0.05% through 0.5% by weight partly because with the composition less than 0.05% by weight, the mechanical strength under a high temperature can not be reinforced and the sputtering of the Cu component can not be decreased, and partly because with the composition more than 0.5% by weight, the respective characteristics mentioned above are not improved.

EXAMPLE 1

With mother alloy having electric copper including Zn, several kinds of ingot having such components as shown in the table 1 were prepared. The respective ingots were drawn so as to shape rough wires of 8 mm diameter under a hot rolling in a known method. The surface of each of the rough wires was peeled off and then each rough wire was subjected to intermediate drawing processes to draw into 5.4 mm and 2.6 mm diameter with an intermediate heat treatment. Finally there were obtained wire electrodes having the components shown in the table 1, with a 0.2 mm diameter.

Workpieces made of SKD 11 of Japanese Industrial Standard which meets ISO 21 having 50 mm thickness were processed by electro-discharge machining using the respective wire electrodes prepared in the manner as described above. The condition of the discharge machining was as follows;

| | |
|---|---|
| machining voltage | 4 5 Volt |
| average machining current | 9.8 Ampere |
| capacitor | 1.0 $\mu$F |
| ON time | 4.5 $\mu$sec. |
| OFF time | 4.2 $\mu$sec. |
| specific resistivity of pure water | 1.5 $\times$ 10$^4$ $\Omega \cdot$ cm |

The results are shown in the table 1. The processing speed and amount of sputtering of the electrode composition onto the workpiece were represented by the ratio of the processing speed and amount of the sputtering of the examples of the wire electrode of the present invention and those of the conventional wire electrodes by defining the respective processing speed and the amount of the sputtering 1.00 of the conventional copper wire electrode. The processing speed and the amount of the sputtering were measured during the workpieces were cut 5 mm along a straight line.

As understood from the table 1, the subject invention provides a good processing speed and, the amount of the sputtering of the wire electrode material to the workpiece is negligible. Also the production cost of the wire electrode of the invention may be low. In addition the wire electrode of the present invention enables stabilization of the discharge. Furthermore, the wire electrode of the present invention assures finishing of the workpiece with a good surface avoiding formation of a rough surface.

EXAMPLE 2

Mother alloys containing such components as shown in the table 2 were prepared and casted. There were obtained wire electrodes having the components shown in the table 2 with 0.250 mm$\pm$0.001 mm diameter.

Workpieces made of SKD 1 of Japanese Industrial Standard which meets ISO 22 having 40 mm thichness were processed by electro-discharge machining using the respective wire electrodes prepared in the manner as described above. The condition of the discharge machining was as follows;

| | |
|---|---|
| machining voltage | 110 Volt |
| average machining current | 10 Ampere |
| capacitor | 1.0 $\mu$F |
| wire tension force | 860 g |
| specific resistivity of pure water | 4 $\times$ 10$^4$ $\Omega \cdot$ cm |
| | 3 $\times$ 10$^4$ $\Omega \cdot$ cm |
| | 2 $\times$ 10$^4$ $\Omega \cdot$ cm |

Results are shown in the table 2.

As understood from the table 2, it is apparent that the wire electrode according to the example 2 can show good workability of casting and drawing and the sputtering of the wire electrode material to the workpiece is negligible.

weight, Si of 0.1 through 1.2% by weight, Al of 0.01 through 0.18% by weight, and the remainder Cu.

TABLE 1

| | No. | Zn (wt %) | Si (wt %) | other (wt %) | Cu | drawability | processing speed | amount of sputtering of Cu, Zn |
|---|---|---|---|---|---|---|---|---|
| EXAMPLES | 1 | 34.9 | 0.18 | — | rest | good | 1.51 | 0.60 |
| | 2 | 35.1 | 0.33 | — | rest | good | 1.55 | 0.55 |
| | 3 | 35.5 | 0.40 | — | rest | good | 1.53 | 0.38 |
| | 4 | 34.3 | 0.45 | — | rest | slightly bad | 1.65 | 0.19 |
| | 5 | 19.6 | 0.13 | Sn 0.9 | rest | good | 1.31 | 0.65 |
| | 6 | 20.3 | 0.19 | — | rest | good | 1.33 | 0.61 |
| prior art | 1 | tough pitch Cu | | | | good | 1.00 | 1.00 |
| COMPARATIVE | 1 | 34.9 | — | — | rest | good | 1.26 | 0.90 |
| EXAMPLES | 2 | 29.8 | — | — | rest | good | 1.13 | 0.88 |
| | 3 | 34.3 | 0.01 | — | rest | good | 1.20 | 0.88 |
| | 4 | 34.1 | 1.35 | — | rest | impossible | — | — |
| | 5 | 34.1 | — | Sn 1.1 | rest | good | 1.23 | 0.88 |

TABLE 2

| | No. | Zn | Si | Al | others | | Cu | casting | drawability | amount of sputtering of Cu for resistivity of water | | |
|---|---|---|---|---|---|---|---|---|---|---|---|---|
| | | | | | | | | | | $4 \times 10^4$ $\Omega$cm | $3 \times 10^4$ $\Omega$cm | $2 \times 10^4$ $\Omega$cm |
| EXAMPLES | 1 | 33.8 | 0.13 | 0.08 | Ga 0.34 | — | rest | good | good | small | none | none |
| | 2 | 34.4 | 0.31 | 0.09 | — | — | rest | good | good | small | none | none |
| | 3 | 34.8 | 0.81 | 0.08 | — | — | rest | good | good | none | none | none |
| | 4 | 34.2 | 1.10 | 0.09 | — | — | rest | good | good | none | none | none |
| | 5 | 34.1 | 0.13 | 0.18 | — | — | rest | good | good | none | none | none |
| | 6 | 33.2 | 0.93 | 0.18 | — | — | rest | good | good | none | none | none |
| | 7 | 33.3 | 0.11 | 0.08 | In 0.23 | Y 0.03 | rest | good | good | none | none | none |
| | 8 | 34.1 | 0.30 | 0.08 | Zr 0.09 | Mg 0.09 | rest | good | good | none | none | none |
| | 9 | 34.2 | 0.19 | 0.09 | Sn 0.33 | — | rest | good | good | none | none | none |
| | 10 | 31.1 | 0.81 | 0.09 | — | — | rest | good | good | small | none | none |
| | 11 | 30.3 | 0.93 | 0.16 | — | — | rest | good | good | small | none | none |
| | 12 | 39.1 | 0.13 | 0.08 | — | — | rest | slightly bad | slightly bad | none | none | none |
| COMPARATIVE | 13 | 34.2 | — | — | — | — | rest | good | good | great | great | great |
| EXAMPLES | 14 | 33.8 | — | 1.2 | — | — | rest | good | good | great | small | none |
| | 15 | 33.9 | 1.1 | — | — | — | rest | good | good | great | none | none |
| | 16 | 34.6 | 1.5 | — | — | — | rest | bad | bad | none | none | none |
| | 17 | 33.2 | 0.05 | 1.2 | — | — | rest | good | good | great | none | none |
| | 18 | 32.9 | — | — | Ni 1.0 | — | rest | good | good | great | great | great |
| | 19 | 26.1 | 0.41 | 0.09 | — | — | rest | good | good | great | great | great |
| | 20 | 45.0 | 0.43 | 0.16 | — | — | rest | good | impossible | — | — | — |

What is claimed is:

1. A wire electrode for use in an electro-discharge machining consisting of Zn of 5 through 38% by weight, Si of 0.1 through 0.5% by weight, and the remainder Cu.

2. A wire electrode for use in an electro-discharge machining consisting of Zn of 30 through 40% by weight, Si of 0.1 through 1.2% by weight, Al of 0.01 through 0.18% by weight, and the remainder Cu.

3. A wire electrode for use in an electro-discharge machining consisting of Zn of 30 through 40% by weight, Si of 0.1 through 1.2% by weight, Al of 0.01 through 0.18% by weight, and one or two components selected from a group consisting of Ga, In, Sn, Mg, Zr and Y with the total amount of 0.05 through 0.5% by weight, and the remainder Cu.

* * * * *